United States Patent
Chan et al.

(10) Patent No.: US 8,799,320 B2
(45) Date of Patent: *Aug. 5, 2014

(54) FIREWALLS FOR SECURING CUSTOMER DATA IN A MULTI-TENANT ENVIRONMENT

(75) Inventors: Eric Chan, Hayward, CA (US); Craig Weissman, San Francisco, CA (US); Paul Nakada, San Francisco, CA (US); Dave Moellenhoff, Orinda, CA (US); Todd McKinnon, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/528,749

(22) Filed: Jun. 20, 2012

(65) Prior Publication Data

US 2012/0260341 A1  Oct. 11, 2012

Related U.S. Application Data

(60) Continuation of application No. 13/286,461, filed on Nov. 1, 2011, now Pat. No. 8,620,876, which is a division of application No. 11/585,527, filed on Oct. 23, 2006, now Pat. No. 8,069,153.

(60) Provisional application No. 60/741,995, filed on Dec. 2, 2005.

(51) Int. Cl.
*G06F 7/00* (2006.01)
*G06F 17/30* (2006.01)

(52) U.S. Cl.
USPC ............................... 707/784; 707/690; 726/11

(58) Field of Classification Search
None
See application file for complete search history.

(56) References Cited

U.S. PATENT DOCUMENTS

| | | | |
|---|---|---|---|
| 5,577,188 A | 11/1996 | Zhu et al. | |
| 5,608,872 A | 3/1997 | Schwartz et al. | |
| 5,649,104 A | 7/1997 | Carleton et al. | |

(Continued)

FOREIGN PATENT DOCUMENTS

| | | | |
|---|---|---|---|
| WO | WO 9916207 | * | 4/1999 |
| WO | WO 0051031 | * | 8/2000 |
| WO | WO 03044676 A1 | * | 5/2003 |

OTHER PUBLICATIONS

Integrated Access Control and Intrusion detection for web servers, Ryutov et al, IEEE Transactions on parallel and distributed systems, 14(9), pp. 841-850, Sep. 2003.*

(Continued)

*Primary Examiner* — Augustine K Obisesan
(74) *Attorney, Agent, or Firm* — Zilka-Kotab, PC

(57) ABSTRACT

Network security is enhanced in a multi-tenant database network environment using a query plan detection module to continually poll the database system to locate and raise an alert for suspect query plans. Security also can be enhanced using a firewall system sitting between the application servers and the client systems that records user and organization information for each client request received, compares this with information included in a response from an application server, and verifies that the response is being sent to the appropriate user. Security also can be enhanced using a client-side firewall system with logic executing on the client system that verifies whether a response from an application server is being sent to the appropriate user system by comparing user and organization id information stored at the client with similar information in the response.

19 Claims, 5 Drawing Sheets

(56) References Cited

U.S. PATENT DOCUMENTS

| | | |
|---|---|---|
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,822,747 A * | 10/1998 | Graefe et al. ................... 1/1 |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,212,524 B1 * | 4/2001 | Weissman et al. ............ 707/600 |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,353,818 B1 * | 3/2002 | Carino, Jr. ....................... 1/1 |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner |
| 6,842,758 B1 * | 1/2005 | Bogrett ........................ 1/1 |
| 6,850,895 B2 | 2/2005 | Brodersen et al. |
| 6,850,949 B2 | 2/2005 | Warner et al. |
| 7,062,502 B1 | 6/2006 | Kesler |
| 7,080,101 B1 * | 7/2006 | Watson et al. ................... 1/1 |
| 7,181,758 B1 | 2/2007 | Chan |
| 7,340,411 B2 | 3/2008 | Cook |
| 7,356,482 B2 | 4/2008 | Frankland et al. |
| 7,401,094 B1 | 7/2008 | Kesler |
| 7,406,714 B1 * | 7/2008 | Nachenberg ................... 726/23 |
| 7,412,455 B2 | 8/2008 | Dillon |
| 7,444,331 B1 * | 10/2008 | Nachenberg et al. ............ 1/1 |
| 7,508,789 B2 | 3/2009 | Chan |
| 7,558,796 B1 * | 7/2009 | Bromwich et al. ................... 1/1 |
| 7,620,655 B2 | 11/2009 | Larsson et al. |
| 7,653,665 B1 * | 1/2010 | Stefani et al. ................... 714/19 |
| 7,698,160 B2 | 4/2010 | Beaven et al. |
| 7,774,361 B1 * | 8/2010 | Nachenberg et al. ......... 707/779 |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,457,545 B2 | 6/2013 | Chan |
| 8,484,111 B2 | 7/2013 | Frankland et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0069369 A1 * | 6/2002 | Tremain ........................ 713/201 |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0046268 A1 * | 3/2003 | Hirabayashi ...................... 707/1 |
| 2003/0065644 A1 * | 4/2003 | Horman et al. ................... 707/1 |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0101355 A1 * | 5/2003 | Mattsson ........................ 713/200 |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0236782 A1 * | 12/2003 | Wong et al. ........................ 707/5 |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0139075 A1 * | 7/2004 | Brodersen et al. ................. 707/6 |
| 2004/0162846 A1 * | 8/2004 | Nakahara et al. ............. 707/102 |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0086195 A1 * | 4/2005 | Tan et al. .......................... 707/1 |
| 2005/0091098 A1 | 4/2005 | Brodersen et al. |
| 2005/0177557 A1 * | 8/2005 | Ziauddin et al. ................... 707/3 |
| 2005/0203921 A1 * | 9/2005 | Newman et al. .............. 707/100 |
| 2005/0210010 A1 * | 9/2005 | Larson et al. ...................... 707/3 |
| 2005/0267866 A1 * | 12/2005 | Markl et al. ....................... 707/2 |
| 2006/0020573 A1 * | 1/2006 | Galindo-Legaria et al. ....... 707/1 |
| 2006/0059154 A1 * | 3/2006 | Raab ................................. 707/9 |
| 2006/0136396 A1 * | 6/2006 | Brobst ............................... 707/3 |
| 2006/0149701 A1 * | 7/2006 | Putzolu ............................. 707/1 |
| 2006/0206477 A1 * | 9/2006 | Dalvi et al. ........................ 707/5 |
| 2006/0212941 A1 * | 9/2006 | Bronnikov et al. ............. 726/24 |

(56) References Cited

U.S. PATENT DOCUMENTS

| | | | |
|---|---|---|---|
| 2006/0218125 A1* | 9/2006 | Kandil et al. | 707/2 |
| 2006/0218205 A1* | 9/2006 | Shimizu et al. | 707/202 |
| 2006/0235831 A1* | 10/2006 | Adinolfi et al. | 707/3 |
| 2006/0248045 A1* | 11/2006 | Toledano et al. | 707/2 |
| 2006/0277220 A1* | 12/2006 | Patrick et al. | 707/200 |
| 2006/0288413 A1* | 12/2006 | Kubota | 726/23 |
| 2008/0249972 A1 | 10/2008 | Dillon | |
| 2009/0063415 A1 | 3/2009 | Chatfield et al. | |
| 2010/0131512 A1* | 5/2010 | Ben-Natan et al. | 707/741 |
| 2012/0259839 A1 | 10/2012 | Chan et al. | |

OTHER PUBLICATIONS

Extending query rewriting techniques for fine-grained access control, Rizvi et al, SIGMOD Jun. 13-18, 2004.*

Analyzing plan diagrams of database query optimizers, Reddy et al, Proceedings of the 31st VLDB Conference, pp. 1228-1239. 2005.*

Using parse tree validation to prevent sql injection attacks, Beuhrer et al, pp. 106-113, SEM 2005.*

Hippocratic data streams—concepts, architectures and issues, Ali et al, Computer science technical reports, Department of Computer Science, Purdue University, Nov. 2005.*

Auditing Compliance with a Hippocratic database, Agrawal et al, Proceedings of the 30th VLDB Conference, pp. 516-527, 2004.*

Non-Final Office Action from U.S. Appl. No. 13/528,744, dated Aug. 9, 2012.

Final Office Action from U.S. Appl. No. 13/528,744, dated Dec. 21, 2012.

Non-Final Office Action from U.S. Appl. No. 13/528,744, dated Jun. 17, 2013.

Final Office Action from U.S. Appl. No. 13/528,744, dated Oct. 11, 2013.

* cited by examiner

FIREWALLS FOR SECURING CUSTOMER DATA IN A MULTI-TENANT ENVIRONMENT

CROSS-REFERENCES TO RELATED APPLICATIONS

This application is a continuation of U.S. application Ser. No. 13/286,461, filed Nov. 1, 2011, entitled "FIREWALLS FOR SECURING CUSTOMER DATA IN A MULTI-TENANT ENVIRONMENT" by Chan et al., which is a divisional of U.S. application Ser. No. 11/585,527, filed Oct. 23, 2006, entitled "SYSTEMS AND METHODS FOR SECURING CUSTOMER DATA IN A MULTI TENANT ENVIRONMENT" by Chan et al., issued as U.S. Pat. No. 8,069,153, which claims the benefit of U.S. Provisional Application No. 60/741,995, filed Dec. 2, 2005, entitled "SYSTEMS AND METHODS FOR SECURING CUSTOMER DATA IN A MULTITENANT ENVIRONMENT," the disclosures of which are incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to securing data in a database network system, and more particularly to securing data in a multi-tenant database network system.

BACKGROUND

In modern database systems, one or more customers may share the various elements of hardware and software of the database system. Such a shared hardware and software approach can enable database related services to be provided at a far lower cost than if each customer had to buy hardware and software for themselves. In such a system it is highly desirable to assure that a customer's data remains secure and only visible and updatable by appropriate users in an organization.

Data security starts with physical security, including intrusion detection and physical access controls. At the network layer, industry standard network firewalls typically are used to block access to all machines within the data center except when appropriate over the HTTP protocol. Also, the network may be scanned from outside the datacenter to assure the network firewall is blocking all unauthorized access. Nonetheless, it is useful to provide additional or alternative security systems and methods as a defense against possible errors or defects in application software, system and network software, and/or system and network hardware that may cause the wrong page or data to be returned to a user.

Therefore it is desirable to provide systems and methods to assure that any error or defect in the shared hardware and software infrastructure does not cause the vital customer data to be delivered to the wrong user.

BRIEF SUMMARY

The present invention provides systems and methods for enhancing system and network security in a multi-tenant database network environment. These systems and methods employ one or more techniques such as identifying suspect query plans, comparing user and organization information included in a query with user and organization information included in a response from an application server to verify that the response is indeed being sent to the appropriate user, and verifying whether a response from an application server is indeed being sent to the appropriate user system by comparing user and organization id information stored at the client with similar information in the response. Employing one or more of these techniques can enable embodiments to secure customer data in a multi-tenant environment.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

According to an embodiment and by way of example, a query plan detection module polls the database system to determine whether any query plans may be suspect query plans, and if so raises an alert. Suspect query plans include those query plans that should never occur in a multi-tenant database system, as well as query plans that should only occur in a small number of identified circumstances, such as joins that read multiple partitions and hash joins, for example. Because each organization's data may be stored in a single physical database partition in a multi-tenant database, any queries initiated by users that would access data in multiple partitions may be considered suspect query plans. Similarly, where a large table is used to store data across multiple tenants, any query plan that reads all or a majority of data rows in the table could be considered suspect. Other suspect query plans not enumerated here for brevity are also contemplated in embodiments. Further, embodiments may perform other actions such as without limitation, discarding the suspect query plan, postponing execution of the query plan, logging an audit message or the like, instead of or in addition to raising an alert. Embodiments may also determine whether a particular suspect query plan is a member of an exception class of query plans, and if so, may permit the query plan to be executed without raising an alert.

According to another embodiment, a server-side firewall system includes a stack of one or more firewall servers sitting between the application servers and the client systems. A firewall server records user and organization information for each client request received, and compares this information with user and organization information included in a response from an application server to verify that the response is indeed being sent to the appropriate user. According to another embodiment, a client-side firewall system includes logic executing on the client system that verifies whether a response from an application server is indeed being sent to the appropriate user system by comparing user and organization id information stored at the client with similar information in the response. The client-side firewall is useful to detect errors in network hardware and/or software message transport.

Client and server firewall embodiments may be based on similar principles: track which user and organization is requesting a page and then ensure that the page returned to the user is actually intended for that user. In embodiments, these approaches can provide a defense against errors or defects in the application software, system software, or hardware that may cause the wrong page to be returned to a user.

In an example client side firewall embodiment, a unique id of the user and organization (e.g., in the user hash cookie) is used to track which user is requesting a page. The server firewall tracks this using a session id (SID) assigned to each session created for an authenticated user directly. Because the SID is potentially sensitive information that may be undesirable to return on every page, the application server in this embodiment injects a user hash directly in the Hyper-text Markup Language (HTML) of the page being returned and a SID in an Hyper-Text Transport Protocol (HTTP) header. The server firewall scans the SID in the header of each page then strips the SID out before returning the page to the client. In one aspect, however, the user hash remains in the html where validated by the client firewall.

The server firewall embodiments can have the advantage that the server firewall runs for every request, while the client firewall only runs for clients that support the logic platform (e.g., Java, JavaScript, ActiveX, etc.) that implements the firewall. The client firewall embodiments, however, can have the advantage that the client firewall can catch errors in the networking layer between the server firewall and the client that would not be caught by the server firewall.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

Various embodiments in accordance with the present invention will be described with reference to the drawings, in which.

DETAILED DESCRIPTION

Figure 1:
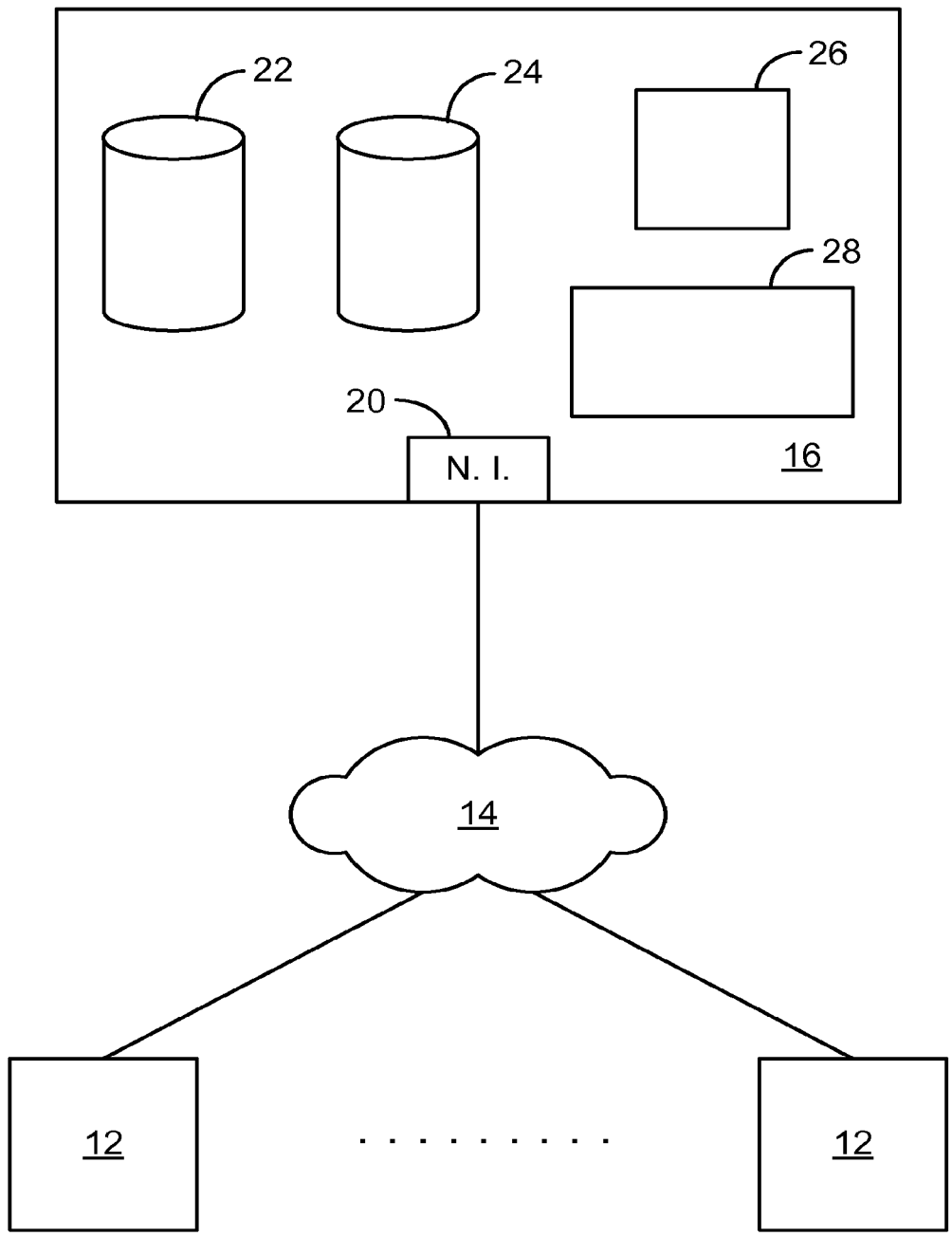
FIG. 1 illustrates an environment wherein a multi-tenant database system might be used.

Embodiments in accordance with the present invention provide systems and methods for securing customer data in a multi-tenant database network environment. In particular, these systems and methods help assure that any error or defect that may occur in the shared software and hardware infrastructure of the multi-tenant database network system does not result in the delivery of pages or data to the wrong user. In certain aspects, these systems and methods analyze query plans and detect certain query plans that should never occur, or that should only occur in a small number of well-defined circumstances. Also, server-side firewall systems and methods in accordance with some embodiments ensure that the security of data and pages sent to users is not affected by server-side infrastructure problems. In certain aspects, client-side firewall systems and methods are provided for ensuring that the security of data and pages sent to users is not affected by network layer infrastructure problems.

Security Overview

Security at the application level may be conceptualized as comprising three chief facets: authentication, authorization, and auditing. Authentication mechanisms typically require each user that logs into a service to enter their password. This password may be checked against a password stored in a database for example to verify the user's identity. Once verified, a session is created for that user and a session id (SID) that may include information such as a user ID, an organization ID, a client IP address, and an expiration time is assigned to the session. Also, the SID may be encrypted to avoid a malicious hacker from changing its contents.

The SID is typically returned to the user as a Hyper-Text Transport Protocol (HTTP) cookie for clients accessing by means of a browser or as a string data field for clients accessing by Application Programming Interface (API). On each subsequent request, the client returns this cookie or data field containing the SID. When processing requests, the application server first reads the SID, decrypts the SID to verify that the SID has not been tampered with, and verifies that the SID has not expired and that the user is still authorized to access the system from the specified IP address. For any requests that happen within the window (e.g., 15 minutes) before the SID is set to expire, an application server may "extend the life of the session" by creating a new SID with a later expiration time.

Authorization mechanisms typically include the application enforcing appropriate access to various features and functions based on user profiles once the application knows the identity of the user and the organization to which the user belongs (from the SID mechanism described above for example). The application also enforces appropriate data row access based on any data sharing rules configured for the organization.

Auditing mechanisms typically include the application logging the date and time of user logins and what actions they perform on the system based on the user ID and organization ID from the SID, for example. This information may be used for various auditing activities.

Next, mechanisms and methods for providing improvements to application security at one or more of the authentication, authorization and auditing facets will be described with reference to example embodiments.

System Overview

FIG. 1 illustrates an environment wherein a multi-tenant database system might be used. As illustrated in FIG. 1 (and in more detail in FIG. 2) user systems 12 might interact via a network 14 with a multi-tenant database system (MTS) 16. The users of those user systems 12 might be users in differing capacities, and the capacity of a particular user system 12 might be entirely determined by permissions (permission levels) for the current user. For example, where a salesperson is using a particular user system 12 to interact with MTS 16, that user system has the capacities allotted to that salesperson. However, while an administrator is using that user system to interact with MTS 16, that user system has the capacities allotted to that administrator. In systems with an hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 can be a LAN (local area network), WAN (wide area network), wireless network, point-to-point network, star network, token ring network, hub network, or other appropriate configuration. As the most common type of network in current use is a TCP/IP (Transfer Control Protocol and Internet Protocol) network such as the global internetwork of networks often referred to as the "Internet" with a capital "I," that will be used in many of the examples herein. However, it should be understood that the networks that the present invention might use are not so limited, although TCP/IP is the currently preferred protocol.

User systems 12 might communicate with MTS 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at MTS 16. Such HTTP server might be implemented as the sole network interface between MTS 16 and network 14, but other techniques might be used as well or instead. In some implementations, the interface between MTS 16 and network 14 includes load sharing functionality, such as round-robin HTTP request distributors to balance loads and distribute incoming HTTP requests evenly over a plurality of servers. Preferably, each of the plurality of servers has access to the MTS's data, at least as for the users that are accessing that server.

In one aspect, the system shown in FIG. 1 implements a web-based customer relationship management (CRM) system. For example, in one aspect, MTS 16 includes application servers configured to implement and execute CRM software applications as well as provide related data, code, forms, Web pages and other information to and from user systems 12 and to store to, and retrieve from, a database system related data, objects and Web page content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain aspects, system 16 implements applications other than, or in addition to, a CRM application. For example, system 16 may provide tenant access to multiple hosted (standard and custom) applications, including a CRM application.

One arrangement for elements of MTS 16 is shown in FIG. 1, including a network interface 20, storage 22 for tenant data, storage 24 for system data accessible to MTS 16 and possibly multiple tenants, program code 26 for implementing various functions of MTS 16, and a process space 28 for executing MTS system processes and tenant-specific processes, such as running applications as part of an application hosting service. Additional processes that may execute on MTS 16 include database indexing processes.

Several elements in the system shown in FIG. 1 include conventional, well-known elements that need not be explained in detail here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from MTS 16 over network 14. Each user system 12 also typically includes one or more user interface devices, such as a keyboard, a mouse, touch screen, pen or the like, for interacting with a graphical user interface (GUI) provided by the browser on a display (e.g., monitor screen, LCD display, etc.) in conjunction with pages, forms, applications and other information provided by MTS 16 or other systems or servers. For example, the user interface device can be used to access data and applications hosted by MTS 16, and to perform searches on stored data, and otherwise allow a user to interact with various GUI pages that may be presented to a user.

As discussed above, the present invention is suitable for use with the Internet, which refers to a specific global inter-network of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium processor or the like. Similarly, MTS 16 (and additional instances of MTS's, where more than one is present) and all of their components might be operator configurable using application(s) including computer code run using a central processing unit such as an Intel Pentium processor or the like, or multiple processor units. Computer code for operating and configuring MTS 16 to intercommunicate and to process web pages, applications and other data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a client system and/or server or server system such as, for example, in C, C++, HTML, any other markup language, Java, JavaScript, ActiveX, any other scripting language such as VBScript, and many other programming languages as are well known.

According to one embodiment, each MTS 16 is configured to provide web pages, forms, applications, data and media content to user (client) systems 12 to support the access by user systems 12 as tenants of MTS 16. As such, MTS 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

Figure 2:
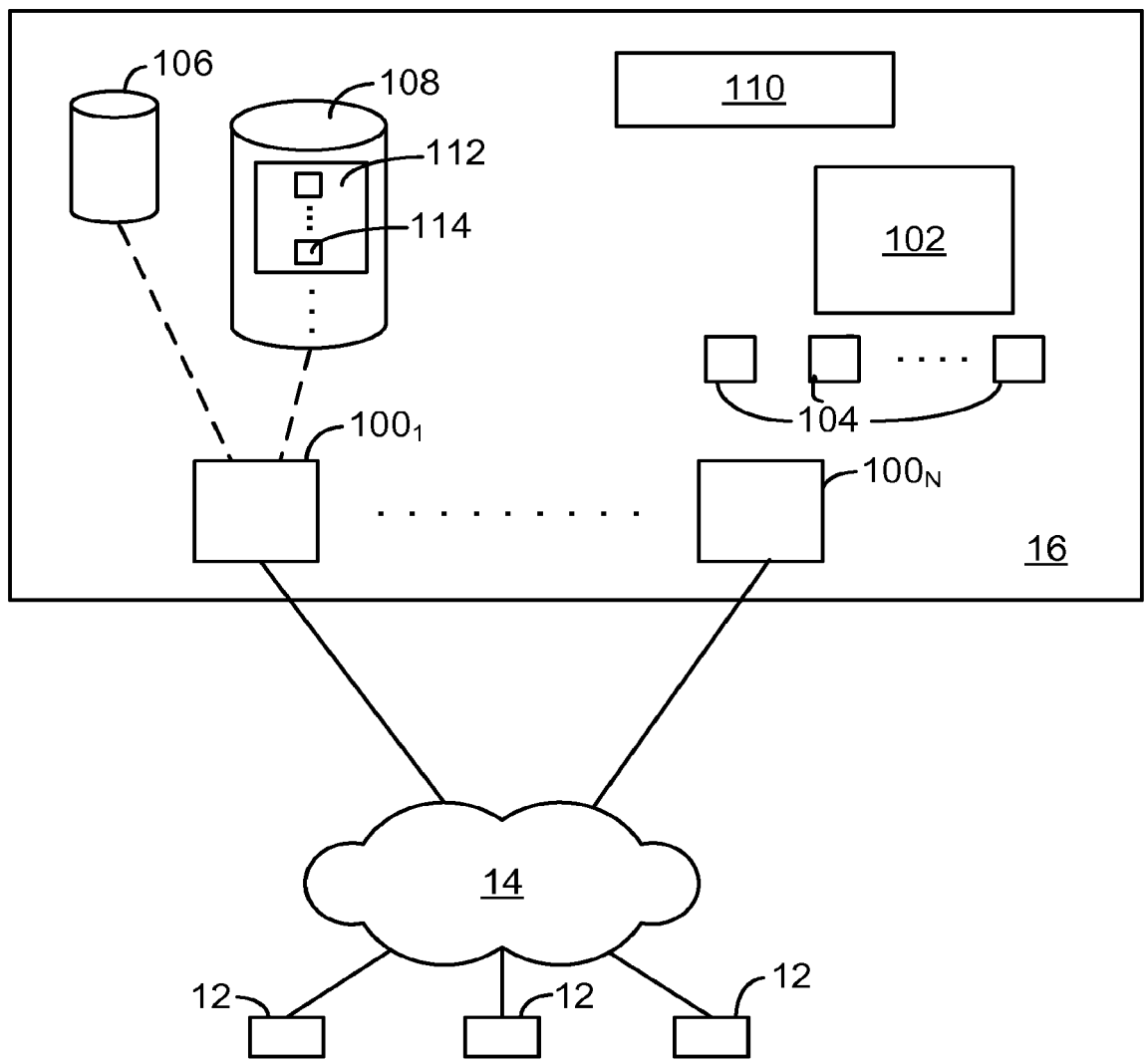
FIG. 2 illustrates elements of FIG. 1 and various interconnections in more detail.

FIG. 2 illustrates elements of MTS 16 and various interconnections in more detail. In this example, the network interface is implemented as one or more HTTP application servers 100. Also shown is system process space 102 including individual tenant process spaces 104, a system database 106, tenant database(s) 108 and a tenant management process space 110. Tenant database 108 might be divided into individual tenant storage areas 112, which can be either a physical arrangement or a logical arrangement. Within each tenant storage area 112, user storage 114 might similarly be allocated for each user. For example, a copy of a user's most recently used (MRU) items might be stored to user storage area 114. Similarly, a copy of MRU items for an entire organization that is a tenant might be stored to tenant storage area 112.

It should also be understood that each application server 100 may be communicably coupled to database systems, e.g., system database 106 and tenant database(s) 108, via a different network connection. For example, one server $100_1$ might be coupled via the Internet 14, another server $100_{N-1}$ might be coupled via a direct network link, and another server $100_N$ might be coupled by yet a different network connection. Transfer Control Protocol and Internet Protocol (TCP/IP) are typical protocols for communicating between servers 100 and the database system, however, it will be apparent to one skilled in the art that other transport protocols may be used to optimize the system depending on the network interconnect used.

In certain aspects, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system (see, e.g., FIG. 4) implementing a load balancing function (e.g., an F5 Big-IP load balancer) is communicably coupled between the servers 100 and the user systems 12 to distribute requests to the servers 100. In one aspect, the load balancer uses a least connections algorithm to route user requests to the servers 100. Other examples of load balancing algorithms, such as round robin and observed response time, also can be used. For example, in certain aspects, three consecutive requests from the same user could hit three different servers 100, and three requests from different users could hit the same server 100. In this manner, MTS 16 is multi-tenant, wherein MTS 16 handles storage of, and access to, different objects, data and applications across disparate users and organizations.

As an example of storage, one tenant might be a company that employs a sales force where each salesperson uses MTS 16 to manage their sales process. Thus, a user might maintain contact data, leads data, customer follow-up data, performance data, goals and progress data, etc., all applicable to that user's personal sales process (e.g., in tenant database 108). In the preferred MTS arrangement, since all of this data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by MTS 16 that are allocated at the tenant level while other data structures might be managed at the user level. Because an MTS might support multiple tenants including possible competitors, the MTS should have security protocols that keep data, applications, and application use separate. Also, because many tenants will opt for access to an MTS rather than maintain their own system, redundancy, up-time, and backup are additional critical functions and need to be implemented in the MTS.

In addition to user-specific data and tenant-specific data, MTS 16 might also maintain system level data usable by multiple tenants or other data. Such system level data might include industry reports, news, postings, and the like that are sharable among tenants.

In certain aspects, client systems 12 communicate with application servers 100 to request and update system-level and tenant-level data from MTS 16 that may require one or more queries to database system 106 and/or database system 108. MTS 16 (e.g., an application server 100 in MTS 16) automatically generates one or more SQL statements (the SQL query) designed to access the desired information. Database system 108 may generate query plans to access the requested data from the database.

Each database can generally be viewed as a collection of objects, such as a set of logical tables, containing data fitted into predefined categories. A "table" is one representation of a data object, and is used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead and Opportunity data, each containing pre-defined fields. It should be understood that "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, titled "Custom Entities and Fields In a Multi-Tenant Database System", and which is hereby incorporated herein by reference, teaches systems and methods for creating custom objects as well as customizing standard objects in a multi-tenant database system. In certain aspects, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

In a multi-tenant data base system, all customers may share the various elements of hardware and software that run the system. For example, a given application server may simultaneously process requests for hundreds of customers. And a given database table may store rows from thousands of customers. In such a system it is highly desirable to assure that a customer's data remains secure and only visible and updatable by appropriate users in an organization. Although conventional data security may be implemented, such as intrusion detection and physical access controls, and industry standard network firewalls, it is nonetheless useful to provide additional or alternative security systems and methods as a defense against possible errors or defects in application software, system and network software and/or system and network hardware that may cause the wrong page or data to be returned to a user.

Security Features

Figure 3:
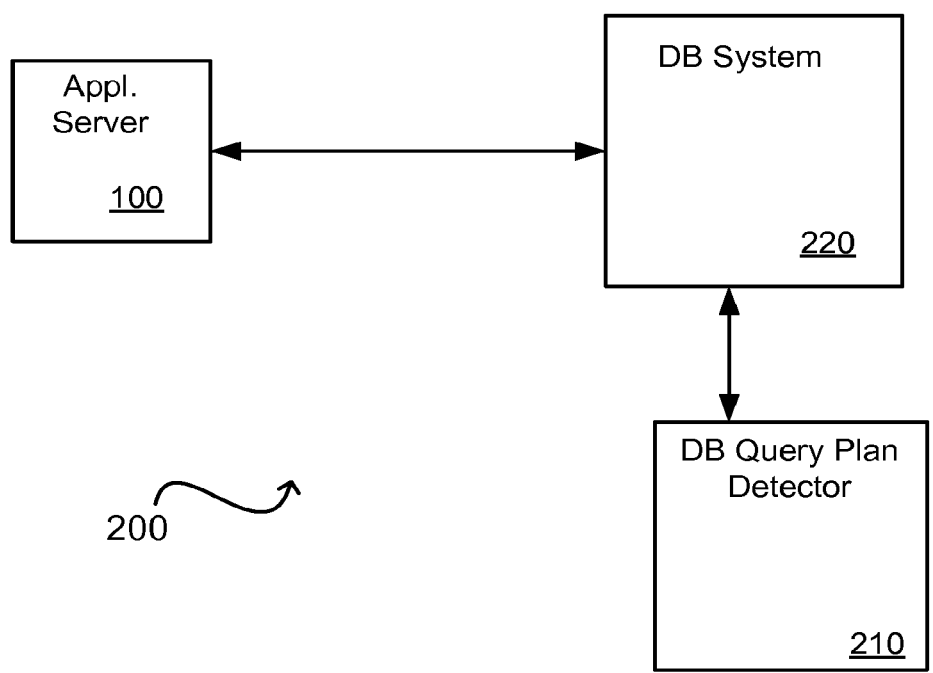
FIG. 3 illustrates the architecture of a database query plan detection system 200 according to one embodiment.

FIG. 3 illustrates a database query plan detection system 200 according to one embodiment. In one aspect, the database query plan detection system of FIG. 3 is implemented in the multi-tenant database system 16 of FIG. 1. As shown, database query plan detection system 200 includes a database query plan detection module 210 communicably coupled to database system 220 (e.g., system database 106 and/or tenant database 108 of FIG. 2). Database query plan detection module 210 implements processes that query the database 220 on a periodic basis to retrieve and analyze query plans. In certain aspects, database query plan detection module 210 is implemented in a separate device as shown, such as a separate server or computer system, although it should be appreciated that or it may be implemented in an application server 100 or in a database server.

In a typical multi-tenant database schema, certain query plans should never occur and others should only occur in a small number of identified circumstances. These might include joins that read multiple partitions and hash joins. For example, because each organization's data may be stored in a single physical database partition, any queries initiated by users that would access data in multiple partitions are suspect. Similarly, where a large table is used to store data across multiple tenants, any query plan that reads all or a majority of data rows in the table would be suspect.

In one aspect, the database query plan detector module executes a background process that runs independently of the database and frequently polls the database for query plans the database is using looking for any unexpected or suspect plans. If it detects any inappropriate or suspect query plans, in one aspect, the module determines whether the suspect plan falls under an exception, e.g., query plans executing system housekeeping tasks, and if not the module logs the information and raises an appropriate alert. If the plan falls under an exception it may be allowed to proceed. Running this query plan detector module both on the production service and during development and testing is useful to detect any code or infrastructure problems that may result in the wrong data being accessed by the wrong customer.

Examples of additional query plans that would be suspect include any plan that involves a full table scan, a merge join Cartesian or a "Partition Hash All" query, or similar operations. In a "Partition Hash All" query execution step, or something similar, the database may read the entire partition into memory and organize it for comprehensive access. This means that the query would be scanning across physical partitions. A query plan executing any full table scan may be indicative of a query that does not include an organization filter. For one typical multi-tenant database schema, a given organizations rows are typically a low percentage of the database table. If the database is performing a full table scan "not using an index" this indicates a query is likely missing an organization ID filter. A merge join cartesian is a specific plan that indicates the database (e.g., a database provided by Oracle, Inc. of Redwood Shores, Calif.) is trying to optimize a query by reading all data from two tables into memory for a query that will access a high percentage of the rows in that table. All of these plans may be valid in some small number of cases, and thus would be present on the "exceptions" list in one aspect.

Figure 4:
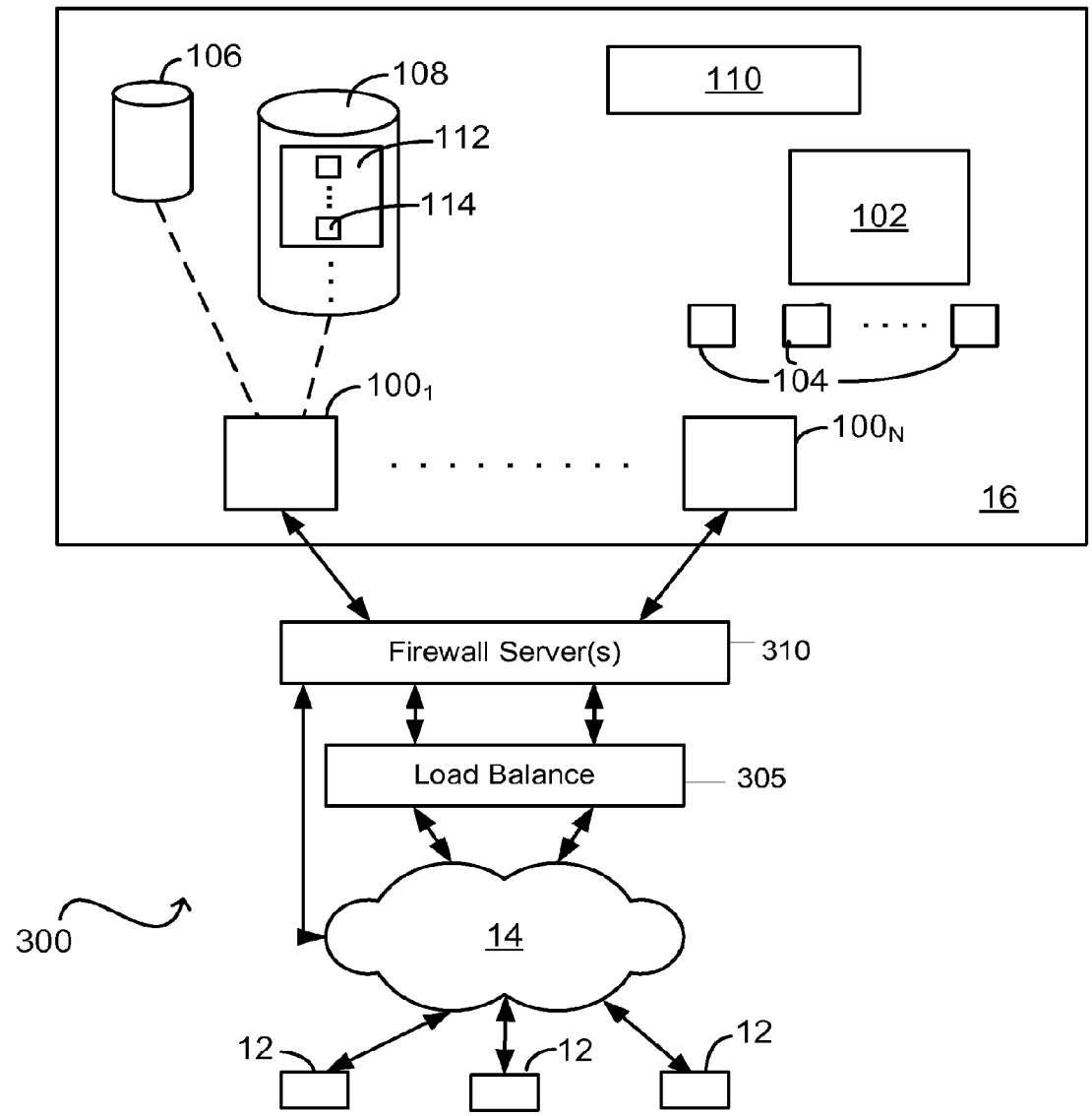
FIG. 4 illustrates the architecture of a server side firewall system 300 according to one embodiment.

FIG. 4 illustrates a server-side firewall system 300 according to one embodiment. In one aspect, the firewall system of FIG. 4 is implemented with the multi-tenant database system 16 of FIG. 1. As shown, firewall system 300 includes one or a plurality of firewall servers 310 communicably coupled to application server(s) 100. Where a load balancing system 305, including one or more load balancing servers, is present, the firewall servers 310 sit between the load balancing system 305 and the application servers 100. However, it should be appreciated that the functionality of a firewall server 310 can be implemented in load balancer system 305 or in an application server 100. However, it is preferred that the firewall server functionality be separate from the application servers and that the firewall servers operate on a different hardware and software platform than the application servers. This makes it much less likely that any infrastructure issues affecting one system (e.g., application server system or firewall server system) will affect the other. Similarly, it is desirable that the load balancing system 305 operate on a different hardware and software platform than firewall servers 310.

In one aspect, as shown in FIG. 4, firewall system 300 includes a separate stack of one or more servers 310 from the application servers 100 that render the UI and perform business logic. The purpose of these firewall servers 310 is to relay requests between the load balancer system 305 and application servers 100. (or between network 14 and application servers 100 where no load balancing functionality is present. For each request they relay, each firewall server 310 performs the following steps:

1) record the SID (or client hash) in the request received from the client 12; and
2) forward the request to an application server 100.

In certain aspects, there may be a one-to-one, one-to-many, or many-to-many correspondence between a load balancer and a firewall server. That is, a load balance server may be configured to address one or more specific firewall servers or it may address any firewall server. Similarly, there may be a one-to-one, one-to-many, or many-to-many correspondence between a firewall server and an application server.

When the application server 100 responds to the received client request, it typically adds a response header containing the SID (or a client hash with user ID and organization ID information) for the response. The firewall server 310 receives the response message, extracts the SID (or client hash), and compares the information in the SID (or client hash) in the response to the information in the SID that was originally issued by the client. If they are different, the firewall server knows that there was some kind of error and responds to the client with an error code instead of the wrong page. It records this error and raises an appropriate alert, e.g., by sending a notification to a system administrator. If the information matches, the firewall server 310 may strip the SID from the body of the page and/or from the HTTP header and forward the response to the requesting client.

Figure 5:
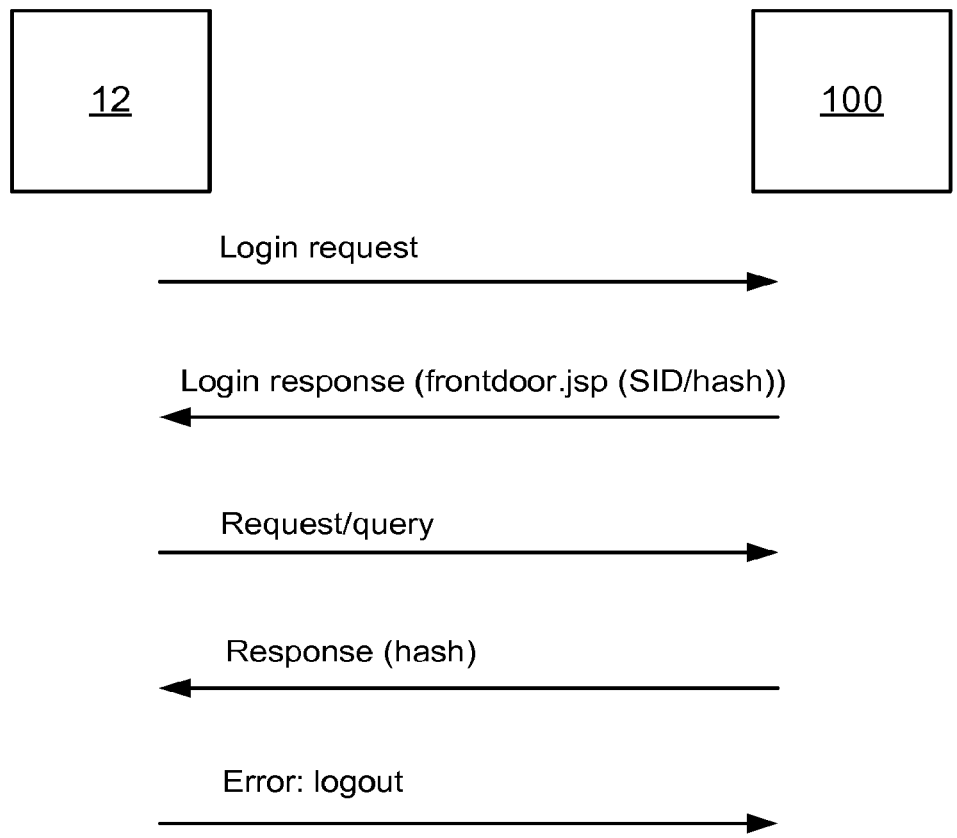
FIG. 5 illustrates client firewall process according to one embodiment of the present invention.

FIG. 5 illustrates an exemplary client firewall process according to one embodiment. In typical operation, a client system initiates a session by sending a login request to MTS 16, which is received by an application server 100. In response, the application sends a login response back to the requesting client system 12. In one aspect, the response includes a login page; the page "frontdoor.jsp" is always the first page a user hits when logging in. This page runs (on the client) a simple login script to verify that the client supports the validation logic. This is important because the client firewall relies on client-side validation logic processing. In one aspect, the validation logic is implemented in JavaScript, and the login script verifies that the client supports JavaScript. If the client does not support JavaScript (or whatever client logic platform the firewall is implemented in), the application will still work but without the firewall.

In one aspect, the "frontdoor.jsp" page sets a SID cookie when the user logs in. Any other page in the service may set the SID cookie if it is first page requested within the window (e.g., 15 minute) before a SID expires. Whenever the SID cookie is set, another cookie is also set called the "user hash". This cookie contains an alphanumeric string that uniquely identifies a given user and organization.

The SID and user hash cookies must be set using client logic (such as JavaScript) instead of HTTP cookie header. This allows the client firewall logic to validate that the page is truly intended for the client before a SID or user hash cookie is set. If the cookies are set using standard HTTP headers, the browser would set the SID and user hash cookies before the client firewall code runs, rendering the check useless.

Returning to FIG. 5, after the user has logged into the system, a request or query may be sent to the system. The application server 100 receives and processes the request, and sends a response message back to the requesting client. In one aspect, for each page sent back to a client, the application server 100 includes a hash of user id and organization id for the user and organization for which the page was generated. It also includes client based logic (e.g., JavaScript) into every page. When received by the client, the client logic executes and validates that the user id and organization id for which the page was generated is the same as the user id and organization that made the original request. In one aspect, this logic compares the user id and organization id stored on the client (e.g., in the SID and/or user hash cookie) with the ids returned with the page. An example of JavaScript source code for this client side logic is as follows:

```
<script language="JavaScript1.2" src="/js/session.js"></script>
<script>
    var hvch = needsClientHash('sid_Client',
        '0000000cBXH00000000062', '65.118.120.94',
        '/servlet/servlet.ClientHashValidator?ResponseRequestedURL=
        %2F0033000000DCGGg');
</script>
```

Examples of JavaScript source code for the function "needsClientHash" and other relevant JavaScript functions is provided below:

```
function putClientHash(name, value, domain, path) {
    document.cookie = name + '=' + value +
        ((domain) ? '; domain=' + domain : '') +
        ((path) ? '; path=' + path : '; path=/');
}
function getClientHash(name) {
    var dc = document.cookie;
    var prefix = name + '=';
    var begin = dc.indexOf('; ' + prefix);
    if (begin == -1) {
        begin = dc.indexOf(prefix);
        if (begin != 0) return null;
    } else {
        begin += 2;
    }
    var end = document.cookie.indexOf(';', begin);
    if (end == -1) {
        end = dc.length;
    }
    return unescape(dc.substring(begin + prefix.length, end));
}
function needsClientHash(hashName, hashValue, clientSrc, nextPage) {
    var clientHash = getClientHash(hashName);
    var needsClientHash = clientHash == hashValue;
    if (!needsClientHash) {
        var currLoc = unescape(window.location.href);
        var index = currLoc.indexOf(hashValue, 0);
        needsClientHash = index > -1;
    }
    if (!needsClientHash) {
        window.location.href = nextPage + '&winLoc=' +
window.location + '&c=' + clientHash + '&s=' + hashValue +'&cs=
' + clientSrc;
    }
    return needsClientHash;
}
```

Similar to the server firewall embodiment, if the client firewall detects a page being delivered to the wrong user or organization, the firewall immediately logs the user out of the application and raises an appropriate alert.

It should be understood that the client firewall validation logic could be implemented using other client programming logic. For example, it could use Java or ActiveX plug ins, etc. If implemented as an ActiveX plug-in, for example, each page sent to a client could include a call to the ActiveX plug-in so as to execute the validation logic.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer program product, comprising a non-transitory computer usable medium having a computer readable program code embodied therein, the computer readable program code adapted to be executed to implement a method, the method comprising:

storing data for each of multiple tenants in at least one database of a database system having hardware and software that is shared by the multiple tenants, wherein the data stored for each of the multiple tenants is located in a logically separate partition of the at least one database;

providing users of each of the multiple tenants access to the database system including:

receiving login information from the user, verifying the user using the login information, and in response to the verification, logging an authentication of the user including a login of the user to the database system, wherein the logged authentication includes a date and time of the login;

providing each of the multiple tenants network access to the at least one database by:

receiving, over a network at one or more load balancing servers, requests from the users of the tenants to access the data stored in the at least one database, wherein the load balancing servers implement load balancing functions, distributing the requests from the one or more load balancing servers to one or more firewall servers, according to the load balancing functions, forwarding the requests from the one or more firewall servers to one or more application servers, wherein the application servers are each communicably coupled to the at least one database for retrieving the data requested by the tenants, and logging an authorization of the users including the requests for which the data is retrieved from the at least one database;

providing a query plan detection module as a component separate from the at least one database, wherein the query plan detector module executes a process that runs independently of the at least one database;

polling the database system for query plans of users of the multiple tenants by the query plan detection module, wherein the query plans each include a set of steps used to access at least a portion of the data in the at least one database of the database system;

analyzing the query plans of the users of the multiple tenants by the query plan detection module;

determining by the query plan detection module whether at least one of the query plans of the users of the multiple tenants is suspect, including:

determining that the at least one of the query plans of the users of the multiple tenants is suspect when the at least one of the query plans of the users of the multiple tenants is of a predetermined type;

in response to determining that at least one of the query plans of the users of the multiple tenants is suspect, logging information associated with the suspect at least one query plan, the information indicating the query plan and an identifier of the user;

wherein, for each of the requests to access the data received from the users of the tenants, the one or more firewall servers:

record first information, the first information identifying a first tenant and a first user of the first tenant from which the request was received, receive, in a response to the request generated by one of the application servers, second information identifying a second tenant and a second user of the second tenant to which the response is destined, and compare the recorded first information with the received second information to verify that the recorded first information matches the received second information and that the response generated by the one of the application servers is being sent to the first user of the first tenant from which the request to access the data was received.

2. The computer program product of claim 1, wherein the query plan detection module prevents execution of a determined suspect query plan.

3. The computer program product of claim 1, wherein the query plan detection module generates an alert if the at least one of the query plans is suspect.

4. The computer program product of claim 1, wherein for each suspect query plan, the query plan detection module determines whether the suspect query plan falls under a query plan exception.

5. The computer program product of claim 4, wherein a suspect query plan falling under a query plan exception is executed.

6. The computer program product of claim 1, wherein the query plan detection module runs during production and development.

7. The computer program product of claim 1, wherein the query plans are analyzed to determine whether the at least one of the query plans is suspect by determining whether the at least one of the query plans is at least one of: a query plan that should never occur in a multi-tenant database system or a query plan that should only occur in a small number of identified circumstances in a multi-tenant database system.

8. The computer program product of claim 1, wherein data of each of the tenants is inaccessible to each of the other tenants.

9. The computer program product of claim 1, further comprising determining that the at least one of the query plans of the users of the multiple tenants is suspect when the at least one of the query plans of the users of the multiple tenants is of the predetermined type and includes predetermined attributes.

10. The computer program product of claim 9, wherein the predetermined type and the predetermined attributes are associated with a known suspect query plan.

11. The computer program product of claim 1, wherein logging information associated with the suspect at least one query plan includes logging an audit message for each query plan determined to be suspect, wherein the audit message indicates the query plan and the identifier of the user.

12. The computer program product of claim 11, wherein the logged messages are utilized for auditing purposes.

13. The computer program product of claim 1, wherein the software of the database system that is shared by the multiple tenants includes custom software for the multiple tenants that is hosted by the database system, wherein the custom software is run as a tenant-specific process.

14. The computer program product of claim 1, wherein the requests to access the data stored in the at least one database are received over the Internet from user systems of the tenants that are connected to the Internet.

15. The computer program product of claim 1, wherein the query plan detection module is a server separate from the at least one database.

16. The computer program product of claim 1, the method further comprising determining that the at least one of the query plans of the users of the multiple tenants is suspect when the at least one of the query plans reads a predetermined number of data rows in a table of the at least one database of the database system storing data for the multiple tenants.

17. The computer program product of claim 1, the method further comprising determining that the at least one of the query plans of the users of the multiple tenants is suspect when the at least one of the query plans accesses data in multiple physical database partitions each storing data for a different one of the multiple tenants.

18. A multi-tenant database system, comprising:

a processor; and one or more stored sequences of instructions which, when executed by the processor, cause the processor to carry out the steps of:

storing data for each of multiple tenants in at least one database of a database system having hardware and software that is shared by the multiple tenants, wherein the data stored for each of the multiple tenants is located in a logically separate partition of the at least one database;

providing users of each of the multiple tenants access to the database system including:
  receiving login information from the user,
  verifying the user using the login information, and
  in response to the verification, logging an authentication of the user including a login of the user to the database system, wherein the logged authentication includes a date and time of the login;
providing each of the multiple tenants network access to the at least one database by:
  receiving, over a network at one or more load balancing servers, requests from the users of the tenants to access the data stored in the at least one database, wherein the load balancing servers implement load balancing functions,
  distributing the requests from the one or more load balancing servers to one or more firewall servers, according to the load balancing functions, forwarding the requests from the one or more firewall servers to one or more application servers, wherein the application servers are each communicably coupled to the at least one database for retrieving the data requested by the tenants, and
  logging an authorization of the users including the requests for which the data is retrieved from the at least one database;
providing a query plan detection module as a component separate from the at least one database, wherein the query plan detector module executes a process that runs independently of the at least one database;
polling the database system for query plans of users of the multiple tenants by the query plan detection module, wherein the query plans each include a set of steps used to access at least a portion of the data in the at least one database of the database system;
analyzing the query plans of the users of the multiple tenants by the query plan detection module;
determining by the query plan detection module whether at least one of the query plans of the users of the multiple tenants is suspect, including:
  determining that the at least one of the query plans of the users of the multiple tenants is suspect when the at least one of the query plans of the users of the multiple tenants is of a predetermined type;
in response to determining that at least one of the query plans of the users of the multiple tenants is suspect, logging information associated with the suspect at least one query plan, the information indicating the query plan and an identifier of the user;
wherein, for each of the requests to access the data received from the users of the tenants, the one or more firewall servers:
  record first information, the first information identifying a first tenant and a first user of the first tenant from which the request was received,
  receive, in a response to the request generated by one of the application servers, second information identifying a second tenant and a second user of the second tenant to which the response is destined, and
  compare the recorded first information with the received second information to verify that the recorded first information matches the received second information and that the response generated by the one of the application servers is being sent to the first user of the first tenant from which the request to access the data was received.

19. A method, comprising:
storing data for each of multiple tenants in at least one database of a database system having hardware and software that is shared by the multiple tenants, wherein the data stored for each of the multiple tenants is located in a logically separate partition of the at least one database;
providing users of each of the multiple tenants access to the database system including:
  receiving login information from the user,
  verifying the user using the login information, and
  in response to the verification, logging an authentication of the user including a login of the user to the database system, wherein the logged authentication includes a date and time of the login;
providing each of the multiple tenants network access to the at least one database by:
  receiving, over a network at one or more load balancing servers, requests from the users of the tenants to access the data stored in the at least one database, wherein the load balancing servers implement load balancing functions, distributing the requests from the one or more load balancing servers to one or more firewall servers, according to the load balancing functions,
  forwarding the requests from the one or more firewall servers to one or more application servers, wherein the application servers are each communicably coupled to the at least one database for retrieving the data requested by the tenants, and
  logging an authorization of the users including the requests for which the data is retrieved from the at least one database;
providing a query plan detection module as a component separate from the at least one database, wherein the query plan detector module executes a process that runs independently of the at least one database;
polling the database system for query plans of users of the multiple tenants by the query plan detection module, wherein the query plans each include a set of steps used to access at least a portion of the data in the at least one database of the database system;
analyzing the query plans of the users of the multiple tenants by the query plan detection module;
determining by the query plan detection module whether at least one of the query plans of the users of the multiple tenants is suspect, including:
  determining that the at least one of the query plans of the users of the multiple tenants is suspect when the at least one of the query plans of the users of the multiple tenants is of a predetermined type;
in response to determining that at least one of the query plans of the users of the multiple tenants is suspect, logging information associated with the suspect at least one query plan, the information indicating the query plan and an identifier of the user;
wherein, for each of the requests to access the data received from the users of the tenants, the one or more firewall servers:
  record first information, the first information identifying a first tenant and a first user of the first tenant from which the request was received,
  receive, in a response to the request generated by one of the application servers, second information identifying a second tenant and a second user of the second tenant to which the response is destined, and
  compare the recorded first information with the received second information to verify that the recorded first information matches the received second information and that the response generated by the one of the application servers is being sent to the first user of the first tenant from which the request to access the data was received.

* * * * *